United States Patent
Kang et al.

(10) Patent No.: US 8,294,870 B2
(45) Date of Patent: Oct. 23, 2012

(54) DISPLAY PANEL COMPRISING AN ACTIVE DEVICE ARRAY SUBSTRATE HAVING A GROOVE WHEREIN THE GROOVE IS EXTENDED TO THE TRANSPARENT SUBSTRATE

(75) Inventors: Liang-Hao Kang, Taoyuan County (TW); Yi-Cheng Tsai, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 210 days.

(21) Appl. No.: 12/943,935

(22) Filed: Nov. 11, 2010

(65) Prior Publication Data

US 2012/0019763 A1  Jan. 26, 2012

(30) Foreign Application Priority Data

Jul. 26, 2010  (TW) ................................ 99214204 U

(51) Int. Cl.
 *G02F 1/1333* (2006.01)
 *G02F 1/1339* (2006.01)
 *G02F 1/1345* (2006.01)

(52) U.S. Cl. .................. 349/160; 349/153; 349/152

(58) Field of Classification Search .................. 349/123, 349/124, 139, 140, 143, 149–154, 158, 160, 349/189, 190

See application file for complete search history.

(56) References Cited

U.S. PATENT DOCUMENTS

| 2004/0150776 | A1* | 8/2004 | Kim .............................. 349/138 |
| 2004/0263740 | A1* | 12/2004 | Sakakura et al. ............. 349/138 |
| 2007/0091247 | A1* | 4/2007 | Onda ............................ 349/153 |
| 2008/0018848 | A1* | 1/2008 | Iwato et al. ................... 349/149 |
| 2009/0242885 | A1 | 10/2009 | Takamatsu et al. |

FOREIGN PATENT DOCUMENTS

TW  I313366  8/2009

* cited by examiner

*Primary Examiner* — Mark Robinson
*Assistant Examiner* — Paul Lee
(74) *Attorney, Agent, or Firm* — Jianq Chyun IP Office

(57) ABSTRACT

A substrate module suitable for being filled with a display medium to form a display panel is provided. The substrate module includes an active device array substrate, an opposite substrate, and a sealant. The active device array substrate has a groove. The opposite substrate is disposed opposite to the active device array substrate. The active device array substrate and the opposite substrate are assembled through the sealant, wherein the display medium is substantially filled in a region surrounded by the sealant to form the display panel and the groove is located between the sealant and a border of the active device array substrate.

10 Claims, 6 Drawing Sheets

DISPLAY PANEL COMPRISING AN ACTIVE DEVICE ARRAY SUBSTRATE HAVING A GROOVE WHEREIN THE GROOVE IS EXTENDED TO THE TRANSPARENT SUBSTRATE

CROSS-REFERENCE TO RELATED APPLICATION

This application claims the priority benefit of Taiwan application serial no. 99214204, filed on Jul. 26, 2010. The entirety of the above-mentioned patent application is hereby incorporated by reference herein and made a part of this specification.

BACKGROUND OF THE INVENTION

1. Field of the Invention

The invention relates to a substrate module, and more particularly to a substrate module of a display panel.

2. Description of Related Art

Generally, a liquid crystal display (LCD) panel mainly consists of an active device array substrate, an opposite substrate, and a liquid crystal layer sandwiched between the active device array substrate and the opposite substrate, wherein the active device array substrate has a plurality of pixel arranged in array and each of the pixels includes an active device and a pixel electrode electrically connected to the active device. The active device array substrate is further disposed with a plurality of scan lines and data lines, and the active device of each pixel is electrically connected to one corresponding scan line and one corresponding data line.

The opposite substrate is usually a color filter substrate, which is disposed above the active device array substrate. The color filter substrate includes a substrate, a light shielding pattern layer, a plurality of color filter patterns, and a common electrode. The color filter patterns are disposed in openings of the light shielding pattern layer and the common electrode covers the light shielding pattern layer and the color filter patterns. For assembling the active device array substrate and the opposite substrate, a sealant is usually formed between the active device array substrate and the opposite substrate while the sealant surrounds the pixel array. The liquid crystal layer is disposed in the enclosed space formed by the active device array substrate, the color filter substrate, and the sealant.

A portion of the active device array substrate can be exposed out after assembling the active device array substrate and the opposite substrate, wherein the exposed portion of the active device array substrate is usually covered by an insulation layer. Once the insulation layer is broken due to an external force, the conductive elements disposed in the active device array substrate can be oxidized or corroded and the liquid crystal materials can be leaked, which causes the result of unfavorable reliability of the liquid crystal display panel.

SUMMARY OF THE INVENTION

The invention provides a substrate module used in a display panel to enhance the reliability of the display panel.

A substrate module suitable for being filled with a display medium to form a display panel is provided. The substrate module includes an active device array substrate, an opposite substrate, and a sealant. The active device array substrate has a groove. The opposite substrate is disposed opposite to the active device array substrate. The active device array substrate and the opposite substrate are assembled through the sealant, wherein the display medium is substantially filled in a region surrounded by the sealant to form the display panel and the groove is located between the sealant and a border of the active device array substrate.

According to an embodiment of the invention, the active device array substrate includes a transparent substrate, a first conductive layer, a second conductive layer, a third conductive layer, a semiconductor layer, a first insulation layer, and a second insulation layer. The first conductive layer, the second conductive layer, and the third conductive layer are sequentially disposed on the transparent substrate. The semiconductor layer is disposed corresponding to a portion of the first conductive layer. The first insulation layer is disposed between the first conductive layer and the second conductive layer. The second insulation layer is disposed between the second conductive layer and the third conductive layer, wherein at least one of the first insulation layer and the second insulation layer is extended from the region surrounded by the sealant to the border of the active device array substrate so that the groove is disposed in the at least one of the first insulation layer and the second insulation layer and the transparent substrate is exposed by the groove. Moreover, the active device array substrate further includes a third insulation layer disposed between the first conductive layer and the semiconductor layer, and the semiconductor layer is disposed between the transparent substrate and the first conductive layer. The third insulation layer is extended from the region surrounded by the sealant to the border of the active device array substrate so that the groove is further disposed in the third insulation layer. In one embodiment, the groove is further extended to the transparent substrate so that the transparent substrate has a thinned area. Specifically, the first conductive layer, the second conductive layer, the third conductive layer, and the semiconductor layer constitute a plurality of pixels and a plurality of connecting terminals. The pixels are located in the region surrounded by the sealant and the connecting terminals are located between the sealant and the border of the active device array substrate. In addition, the connecting terminals are used for transmitting a signal to the pixels. The groove can be located between the connecting terminals and the border of the active device array substrate. In addition, each pixel includes an active device and a pixel electrode electrically connected to the active device.

According to an embodiment of the invention, the groove is located corresponding to at least one side of the sealant.

According to an embodiment of the invention, the groove completely surrounds the sealant.

According to an embodiment of the invention, the groove is a continuous straight line groove.

According to an embodiment of the invention, the groove includes a plurality of segments. For example, the segments include a plurality of straight line segments, a plurality of arc segments, or a combination thereof.

In light of the foregoing, the substrate module according to the invention includes an active device array substrate, an opposite substrate, and a sealant. The active device array substrate has a groove located outside of the region surrounded by the sealant. When the substrate module is subjected to an external force, the disposition of the groove is conducive to release the stress, which facilitates the enhancement of the reliability of the substrate module and that of the display panel having the substrate module.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
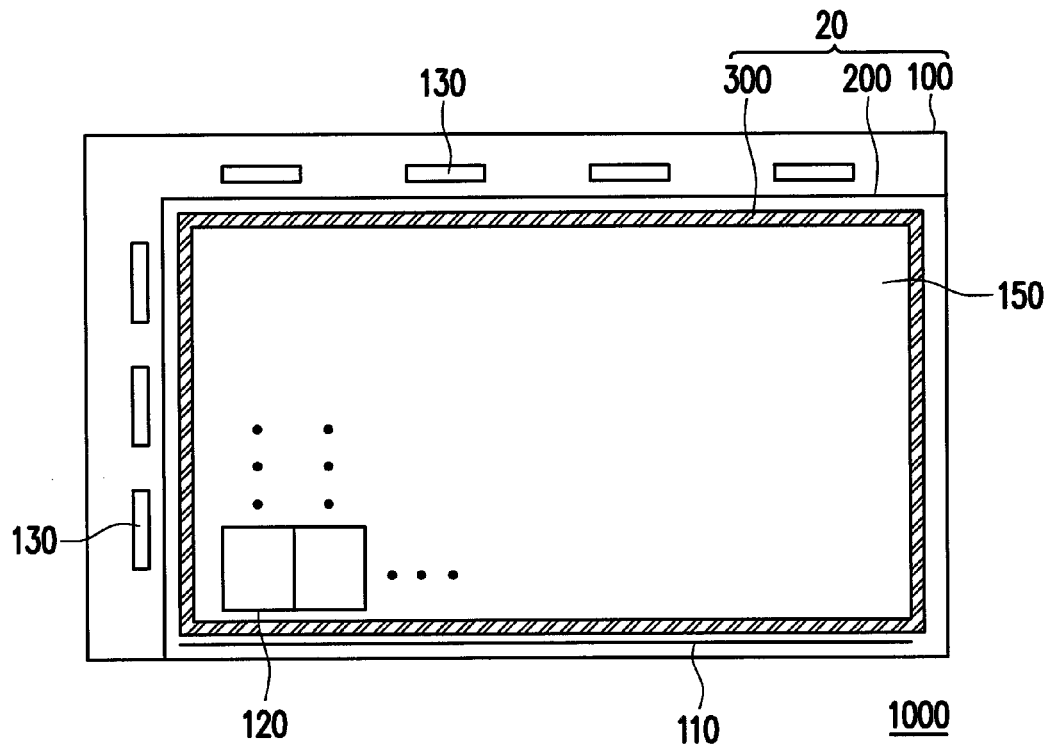
FIG. 1 schematically illustrates a display panel according to an embodiment of the invention.

FIG. 1 schematically illustrates a display panel according to an embodiment of the invention. Referring to FIG. 1, a substrate module 10 includes an active device array substrate 100, an opposite substrate 200, and a sealant 300. The active device array substrate 100 has a groove 110. The opposite substrate 200 and the active device array substrate 100 are disposed opposite to each other so that the opposite substrate 200 and the active device array substrate 100 are overlapped in FIG. 1. The active device array substrate 100 and the opposite substrate 200 are assembled through the sealant 300. That is, the sealant 300 is disposed between the active device array substrate 100 and the opposite substrate 200. In addition, the groove 110 is located between the sealant 300 and the border of the active device array substrate 100.

In specific, the substrate module 10 is suitable for being filled with a display medium 150 so as to form a display panel 1000, wherein the display medium 150 is substantially filled in the region surrounded by the sealant 300. The display medium 150 can be liquid crystal material, electrowetting display material, electrophoresis display material, organic light emitting display material, or the like. The active device array substrate 100 includes a plurality of pixels 120 and a plurality of connecting terminals 130, wherein the pixels 120 are, for example, located within the region surrounded by the sealant 300 and the connecting terminals 130 are located outside of the region surrounded by the sealant 300. The connecting terminals 130 are used for transmitting a signal to the pixels 120, i.e. each of the pixels 120 is electrically connected to a portion of the connecting terminals 130.

According to the present embodiment, the groove 110 is exposed out of the region surrounded the sealant 300. The disposition of the groove 110 is conducive to release the stress when the active device array substrate 100 is subjected to an external force such as a collision, a corrosion, etc. Accordingly, the stress is difficultly transmitted to entering the region surrounded by the sealant 300, which is capable of reducing the probability of the damage on the elements such as pixels 120. The disposition of the groove 110 is thus conducive to enhance the reliability of the substrate module 10 and that of the display panel having the substrate module 10.

In general, the substrate module 10 is vertically set up for facilitating a user to use a display panel having the substrate module 10. In the meantime, the left side, the right side, the upper side, and the bottom side of the substrate module 10 can be defined as that the upper side and the bottom side are respectively the sides away from the ground and adjacent to the ground and the other two sides are the right side and the left side thereof. Under such configuration, the connecting terminals 130 illustrated in FIG. 1 are, for instance disposed at the left side and the upper side of the substrate module 10. In addition, as shown in FIG. 1, the groove 110 is configured at the bottom side thereof. The bottom side is the side subjected to larger gravity. If the bottom side is damaged or cracked, the display medium 150 filled in the substrate module 10 can be easily leaked from the bottom side. In particular, when the crack is extended to a place within the region surrounded by the sealant 300, the leakage of the display medium 150 at the bottom side is, in all probability, caused. Therefore, the groove 110 is disposed at the bottom side according to the present embodiment, which efficiently prevents the stress from entering the region surrounded by the sealant 300 and thereby restrains the leakage of the display medium 150. Accordingly, the substrate module 10 and the display panel 150 having the substrate module 10 can have desirable reliability.

Figure 2:
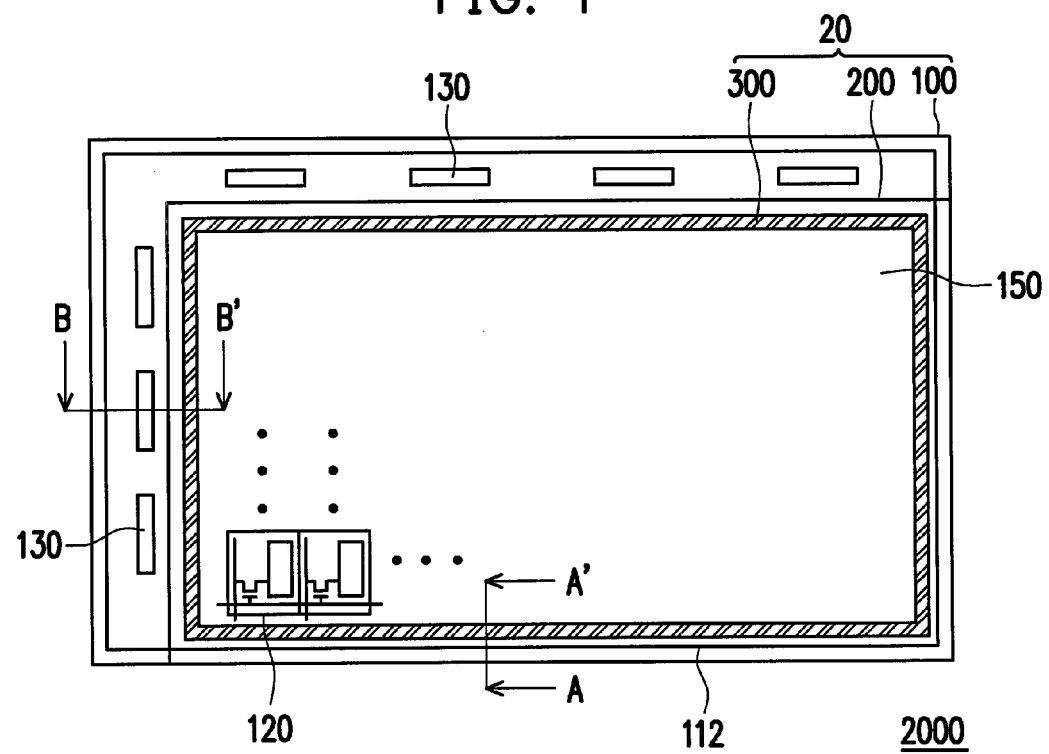
FIG. 2 schematically illustrates a display panel according to another embodiment of the invention.

The invention is not limited thereto. In other embodiments, the groove 110 can be disposed in other ways. In an embodiment, the groove 110 can be formed corresponding to at least one side of the sealant 300. For instance, FIG. 2 schematically illustrates a display panel according to another embodiment of the invention. Referring to FIG. 2, the substrate module 20 and the substrate module 10 are substantially the same while the difference therebetween mainly lies in the disposition location of the groove 112. Accordingly, the same elements are marked by the same reference number in FIGS. 1 and 2. In addition, the display medium 150 is, for example, filled in the substrate module 20 to form a display panel 2000. In the present embodiment, the groove 112 of the substrate module 20 completely surrounds the sealant 300. Namely, the groove 112 formed as a ring pattern is disposed between the sealant 300 and the border of the active device array substrate 100. In specific, a portion of the groove 112 is located between the connecting terminals 130 and the border of the active device array substrate 100. Under this configuration, the groove 112 can provide the effect of releasing stress at the entire periphery of the substrate module 20 and conduce to enhance the reliability of the substrate module 20. In other embodiments, the groove 112 can be selectively disposed at a portion of the periphery of the substrate module 20 without completely surrounding the sealant 300.

Figure 3:
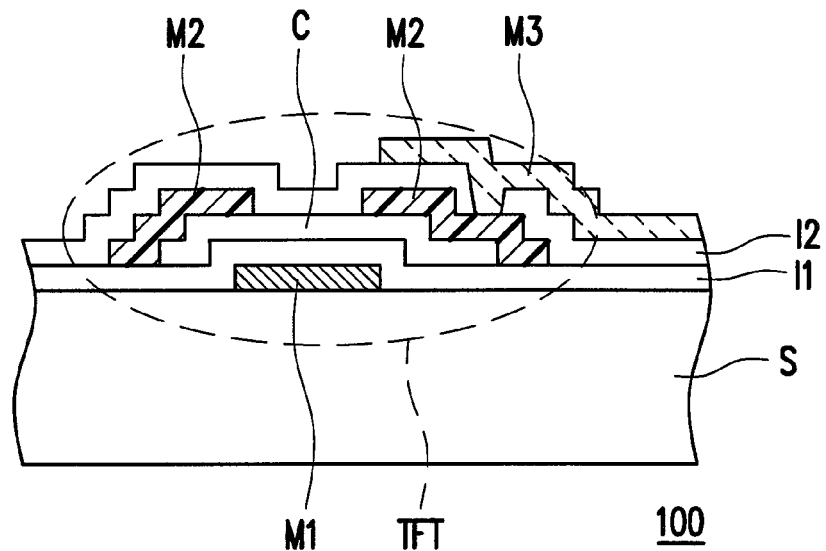
FIG. 3 schematically illustrates a partial cross-sectional view of an active device array substrate according to an embodiment of the invention, wherein one pixel is shown.

In detail, a plurality of film layers are disposed on the active device array substrate 100, wherein each of the film layers can be patterned so as to constitute the pixels 120 and the connecting terminals 130. FIG. 3 schematically illustrates a cross-sectional view of an active device array substrate according to an embodiment of the invention, wherein one pixel is shown. Referring to FIG. 3, the active device array substrate 100 includes a transparent substrate S, a first conductive layer M1, a second conductive layer M2, a third conductive layer M3, a semiconductor layer C, a first insulation layer I1, and a second insulation layer I2. The first conductive layer M1, the second conductive layer M2, and the third conductive layer M3 are sequentially disposed on the transparent substrate S. The semiconductor layer C is disposed corresponding to a portion of the first conductive layer M1. The first insulation layer I1 is disposed between the first conductive layer M1 and the second conductive layer M2. The second insulation layer I2 is disposed between the second conductive layer M2 and the third conductive layer M3.

In the present embodiment, the pattern of the first conductive layer M1 can define a gate, the pattern of the second conductive layer M2 can define a source and a drain, and the semiconductor layer C is located above the gate as well as between the source and the drain. Herein, the gate, the source, and the drain together constitute an active device TFT. In addition, the pattern of the third conductive layer M3 can define a pixel electrode, wherein the pixel electrode is electrically connected to the active device TFT to form the pixel 120 illustrated in FIGS. 1 and 2. It is noted that the connecting terminal 130 illustrated in FIGS. 1 and 2 can be consisted of at least two of the first conductive layer M1, the second conductive layer M2, and the third conductive layer M3. In addition, when the cross-sectional structure depicted in FIG. 3 is applied in the substrate modules 10 and 20 as illustrated in FIGS. 1 and 2, at least one of the first insulation layer I1 and the second insulation layer I2 is extended from the region surrounded by the sealant 300 to the border of the active device array substrate 100 so that the grooves 110 and 112 are disposed in the at least one of the first insulation layer I1 and the second insulation layer I2 while the grooves 110 and 112 expose the transparent substrate S.

Figure 4:
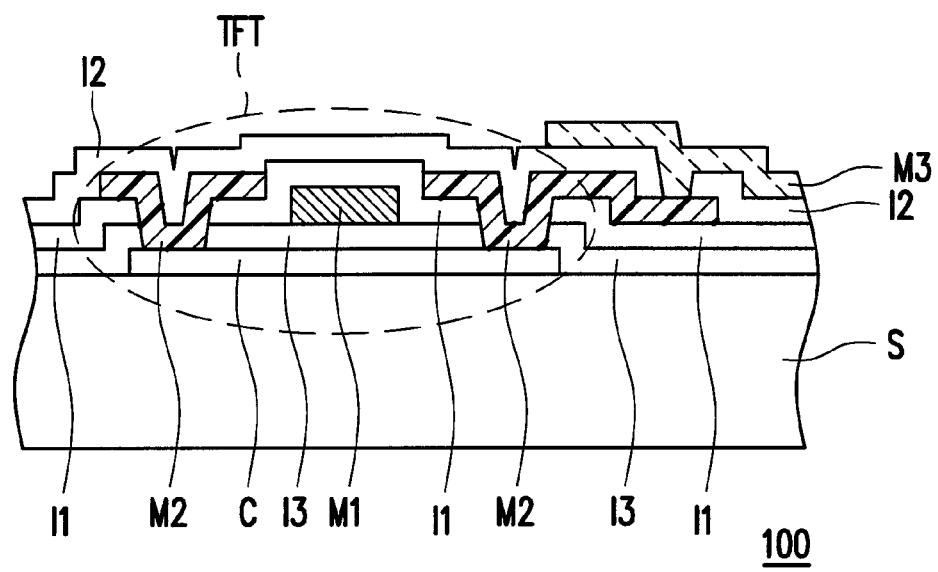
FIG. 4 schematically illustrates a partial cross-sectional view of an active device array substrate according to another embodiment of the invention, wherein one pixel is shown.

Nevertheless, the aforesaid stacking structure of the film layers is taken as an example and is not intent to limit the invention. FIG. 4 schematically illustrates a partial cross-sectional view of an active device array substrate according to another embodiment of the invention, wherein one pixel is shown. Referring to FIG. 4, the semiconductor layer C can be located under the gate (i.e. the first conductive layer M1) in the pixel design of the active device array substrate 100. Furthermore, the active device array substrate 100 can further includes a third insulation layer I3 which is disposed between the gate (the first conductive layer M1) and the semiconductor layer C. Under such configuration, the semiconductor layer C is disposed between the transparent substrate S and the first conductive layer M1. When the cross-sectional structure depicted in FIG. 4 is applied in the substrate modules 10 and 20 as illustrated in FIGS. 1 and 2, at least one of the first insulation layer I1 and the second insulation layer I2 is extended from the region surrounded by the sealant 300 to the border of the active device array substrate 100 so that the grooves 110 and 112 are disposed in the at least one of the first insulation layer I1 and the second insulation layer I2 and the grooves 110 and 112 expose the transparent substrate S. In addition, the third insulation layer I3 can be selectively extended from the region surrounded by the sealant 300 to the border of the active device array substrate 100 so that the grooves 110 and 112 can be further disposed in the third insulation layer I3.

It is noted that the first insulation layer I1 is disposed between the first conductive layer M1 and the second conductive layer M2 and the second insulation layer I2 is disposed between the second conductive layer M2 and the third conductive layer M3 according the stacking sequence of the film layers. In addition, the pattern of the second conductive layer M2 can define a source and a drain so that the source, the drain, and the gate (the first conductive layer M1) together constitute the active device TFT. The third conductive layer M3 defines a pixel electrode, wherein the pixel electrode is electrically connected to the active device TFT to form the pixel 120 illustrated in FIGS. 1 and 2. In other portions of the substrate module 20 not illustrated in FIG. 4, the connecting terminal 130 depicted in FIGS. 1 and 2 can be consisted of at least two of the first conductive layer M1, the second conductive layer M2, and the third conductive layer M3.

According to the aforesaid cross-sections, the first insulation layer I1 and the second insulation layer I2 are used for isolating different conductive layers, which substantially cover the entire top surface of the transparent substrate S. Certainly, the third insulation layer I3 can also cover the entire top surface of the transparent substrate S to provide the effects of isolation and protection. The grooves 110 and 112 depicted in FIGS. 1 and 2 can be disposed on at least one of the first insulation layer I1 and the second insulation layer I2. Alternately, referring to FIG. 1 to FIG. 4 together, the grooves 110 and 112 depicted in FIGS. 1 and 2 can be disposed on at least one of the first insulation layer I1, the second insulation layer I2, and the third insulation layer I3 as shown in FIGS. 3 and 4. A partial cross section of the substrate module 20 is provided for further describing the design of the groove. It is noted that the insulation layer depicted in the following can be at least one of the first insulation layer I1 and the second insulation layer I2 illustrated in FIG. 3 or at least one of the first insulation layer I1, the second insulation layer I2, and the third insulation layer I3 illustrated in FIG. 4. In addition, the conductive layer in the following can be any one or more of the first conductive layer M1, the second conductive layer M2, and the third conductive layer M3.

Figure 5:
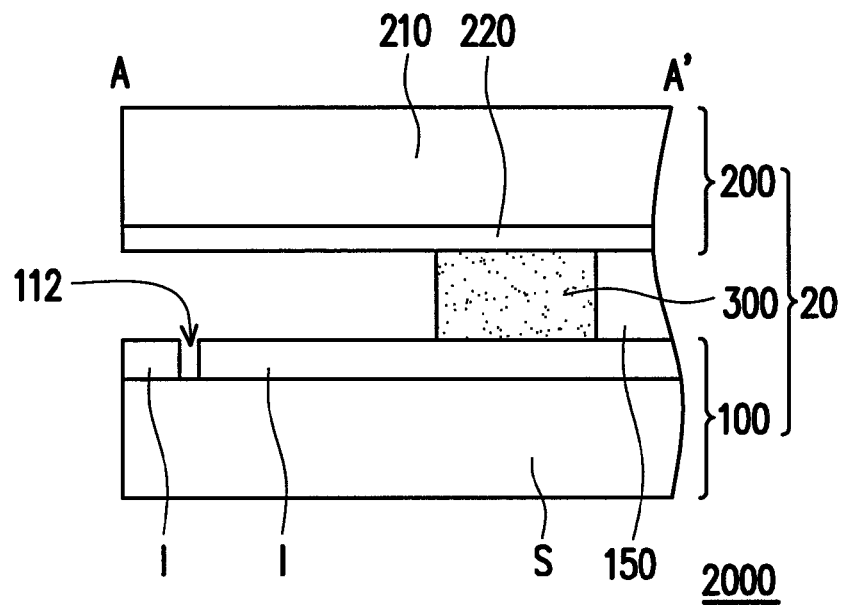
FIGS. 5 and 6 are cross-sectional views of the display panel depicted in FIG. 2 along sectional lines A-A' and B-B', respectively according to an embodiment of the invention.
Figure 6:
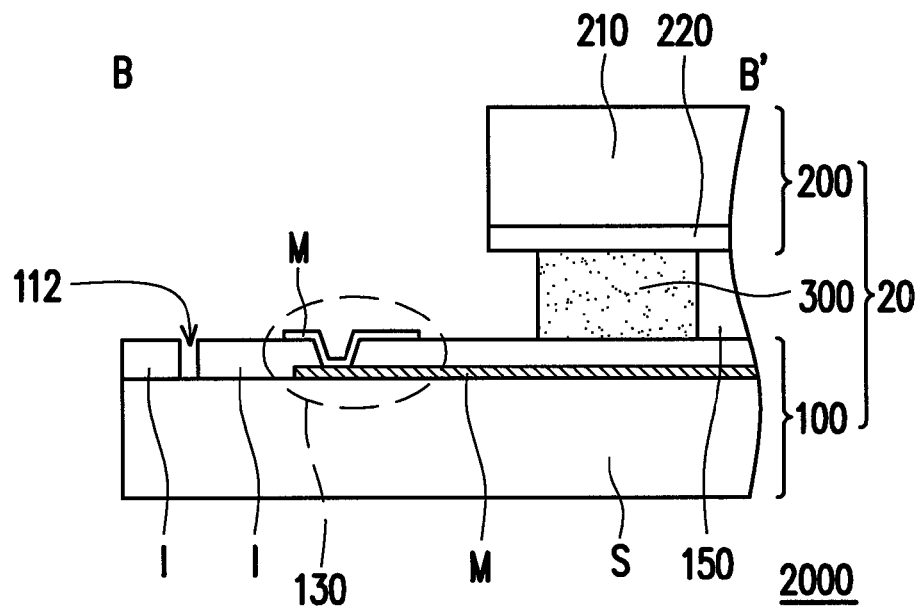

FIGS. 5 and 6 are cross-sectional views of the display panel depicted in FIG. 2 along sectional lines A-A' and B-B', respectively according to an embodiment of the invention. Referring to FIGS. 5 and 6, the display medium 150 is filled in the substrate module 20 to form the display panel 2000. In the drawings of FIGS. 5 and 6, the illustrated elements of the active device array substrate 100 in the substrate module 20 includes the transparent substrate S, the insulation layer I, and the connecting terminal 130, wherein the insulation layer I and the connecting terminal 130 are disposed on the transparent substrate and the connecting terminal 130 is, for instance, formed by a plurality of conductive layers M. Specifically, referring to FIG. 3 to FIG. 6 together, the conductive layers M depicted in FIGS. 5 and 6 can be formed by a portion of the patterns constructed from any two of the first conductive layer M1, the second conductive layer M2, and the third conductive layer M3 as shown in FIG. 3 or FIG. 4. In addition, the insulation layer I depicted in FIGS. 5 and 6 can be formed by at least one of the first insulation layer I1, the second insulation layer I2, and the third insulation layer I3 as shown in FIG. 4.

The opposite substrate 200 includes the transparent substrate 210 and the common electrode 220 disposed on the transparent substrate 210. The opposite substrate 200 and the active device array substrate 100 are disposed opposite to each other and the common electrode 220 faces to the insulation layer I. Moreover, the sealant 300 is disposed between the active device array substrate 100 and the opposite substrate 200. It is noted that the groove 112 is disposed in the insulation layer I and exposes the transparent substrate S. Namely, a depth of the groove 112 is substantially greater than or identical to a thickness of the insulation layer I, which renders the exposing of the transparent substrate S.

In one embodiment, when the insulation layer I is formed by the first insulation layer I1 and the second insulation I2 depicted in FIG. 3, the depth of the groove 112 can be greater than or identical to the total thickness of the first insulation layer I1 and the second insulation layer I2. When the insulation layer I is formed merely by the first insulation layer I1 depicted in FIG. 3, the depth of the groove 112 can be greater than or identical to the thickness of the first insulation layer I1. When the insulation layer I is formed merely by the second insulation layer I2 depicted in FIG. 3, the depth of the groove 112 can be greater than or identical to the thickness of the second insulation layer I2. Alternately, when the insulation layer I is formed by at least one of the first insulation layer I1, the second insulation I2, and the third insulation layer I3 depicted in FIG. 4, the depth of the groove 112 can be greater than or identical to the total thickness of said at least one.

Once the substrate module 20 is subjected to an external force such as a cracking stress, the stress is transmitted from the periphery of the substrate module 20 toward the region surrounded by the sealant 300. The insulation layer I can be cracked due to the external force. As long as the crack is extended to entering the region surrounded by the sealant 300, the elements, such as the pixel 120 illustrated in FIG. 2, disposed inside the region surrounded by the sealant 300 may be oxidized or corroded owing to the temperature, the humidity, the acidity, and the like of the environment. Furthermore, the display medium (not shown) filled in the substrate module 20, if is, may leak from the crack. Accordingly, the groove 112 is disposed between the border of the active device array substrate 100 and the sealant 300 in the present embodiment, which facilitates the prevention from the aforesaid problem.

Specifically, the insulation layer I according to the present embodiment substantially covers a top surface of the transparent substrate S which is the surface disposed with the elements such as the pixels. Furthermore, the insulation layer I is extended from the region surrounded by the sealant 300 to the border of the active device array substrate 100. Therefore, when the substrate module 20 is subjected to the external force, the insulation layer I is directly subjected to the external force. The stress can be released through the groove 112 during transmitting from the border of the insulation layer I toward the region surrounded by the sealant 300 by passing the groove 112 prior to entering the region surrounded by the sealant 300. Therefore, the stress is difficultly transmitted to entering the region surrounded by the sealant 300, which protects the elements, such as the pixel 120 illustrated in FIG. 2, disposed within the region surrounded by the sealant 300. When a crack formed in the insulation layer I due to the stress, the crack is restrained between the border of the active device array substrate 100 and the groove 112 without extended to entering a region between the groove 112 and the sealant 300 and the crack is unlikely extended to entering the region surrounded by the sealant 300. The elements disposed within the region surrounded by the sealant 300 can be prevented from damage, which is conducive to enhance the reliability of the substrate module 20. The use of the substrate module 20 in a display panel facilitates the restraints of the leakage of the display medium and the corrosion of the element therein.

Figure 7:
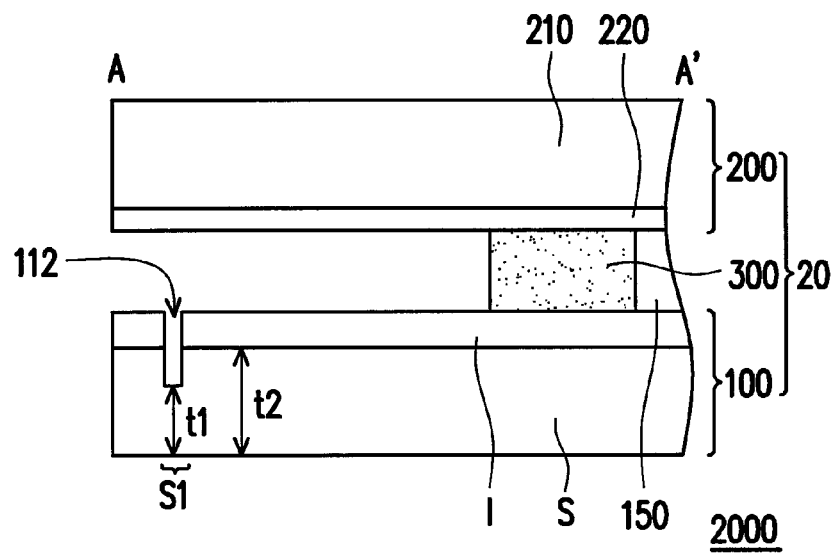
FIGS. 7 and 8 are cross-sectional views of the display panel depicted in FIG. 2 along sectional lines A-A' and B-B', respectively according to another embodiment of the invention.
Figure 8:
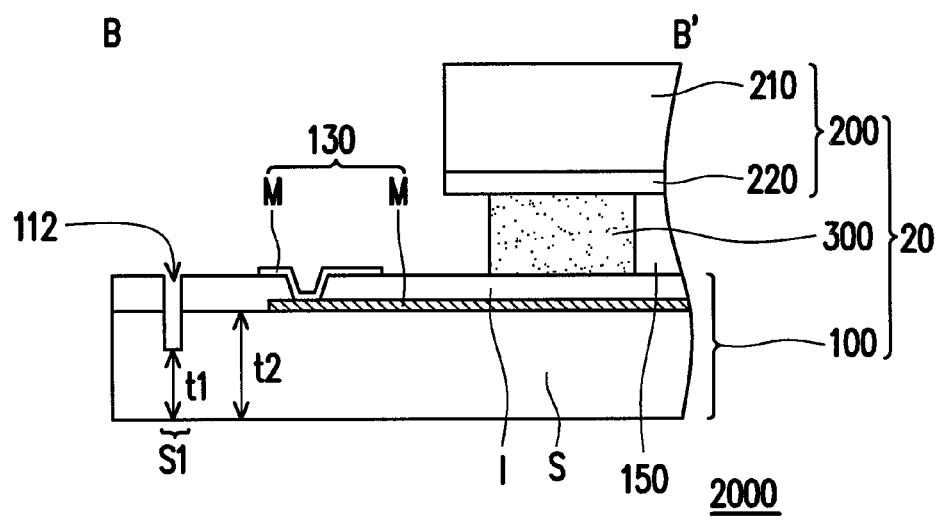

FIGS. 7 and 8 are cross-sectional views of the display panel depicted in FIG. 2 along sectional lines A-A' and B-B', respectively according to another embodiment of the invention. The cross sections illustrated in FIGS. 7 and 8 are substantially similar to those depicted in FIGS. 5 and 6, respectively and the difference therebetween mainly lies in the depth of the groove 112. That is to say, the display medium 150 is filled in the substrate module 20 to form the display panel 2000. In specific, in addition to the depth of the groove 112, the elements illustrated in FIG. 7 and those illustrated in FIG. 5 are identical. Similarly, in addition to the depth of the groove 112, the elements illustrated in FIG. 8 and those illustrated in FIG. 6 are identical.

Referring to FIG. 7 and FIG. 8, the groove 112 is further extended to the transparent substrate S so that the transparent substrate S has a thinned area S1 according to the present embodiment. A thickness t1 of the transparent substrate S in the thinned area S1 is smaller than a thickness t2 of the transparent substrate S in other areas. That is to say, the depth of the groove 112 is not limited in the invention. Merely the depth of the groove 112 is not smaller than the thickness of the insulation layer I disposed outside the sealant 300, can be effect of releasing stress be achieved, which is contributed to enhance the reliability of the substrate module 20. In one embodiment, the groove 112 can be formed by an additional pattern process after the fabrication of the active device array substrate 100. Alternately, the groove 112 can be formed simultaneously during the pattern process for forming the pixels in the active device array substrate 100, wherein the pattern process can be a laser cutting process, a photolithographic etching process, or other process capable of partially patterning the film layers. It is noted that the depth of the groove 112 can be determined by the condition of the patterning process according to the present embodiment.

Figure 9:
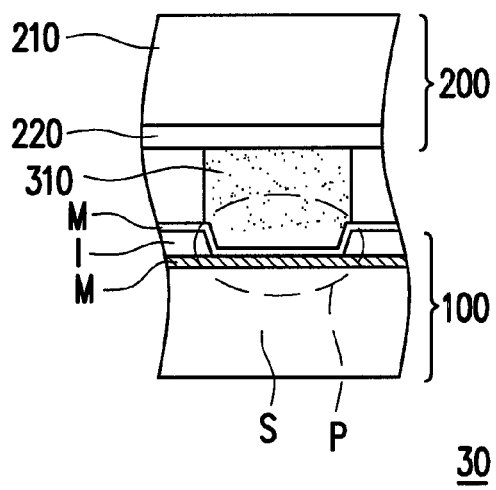
FIG. 9 schematically illustrates a substrate module according to further another embodiment of the invention, wherein the sealant is served as a conductive element.

Specifically, the sealant 300 is not restricted by the aforesaid embodiment. In one embodiment, the sealant 300 can be a conductive element so that the common electrode 220 and the conductive layer M on the active device array substrate 100 can be electrically connected therethrough. For instance, FIG. 9 schematically illustrates a substrate module according to further another embodiment of the invention, wherein the sealant is served as a conductive element. Referring to FIG. 9, a substrate module 30 includes an active device array substrate 100, an opposite substrate 200, and a sealant 310. The active device array substrate 100 includes a transparent substrate S, an insulation layer I, and a plurality of conductive layers M, wherein the insulation layer I and the conductive layers M are disposed on the transparent substrate S and the conductive layers M together constitute a connecting pad structure P. The opposite substrate 200 includes the transparent substrate 210 and the common electrode 220 disposed on the transparent substrate 210. The sealant 310 is disposed between the connecting pad structure P and the common electrode 220, and the sealant 310 can be a conductive sealant. Therefore, the common electrode 220 is electrically connected with the connecting pad structure P through the sealant 310. Nevertheless, the above mentioned embodiments are taken as examples and are not intent to limit the invention.

Figure 10:
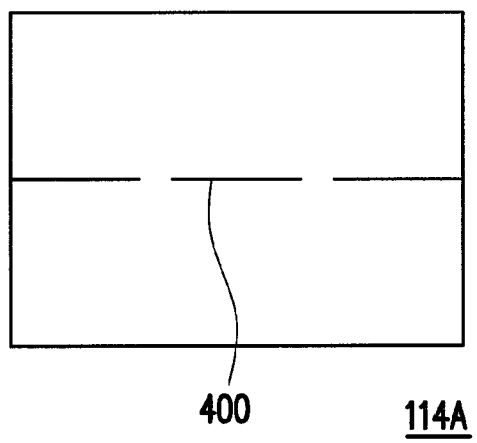
FIGS. 10 through 13 illustrate a plurality of designs of the groove.
Figure 11:
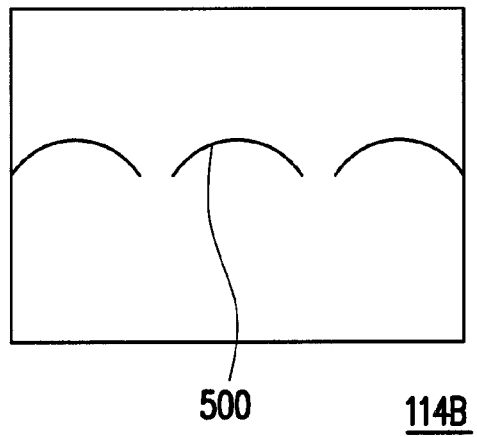
Figure 12:
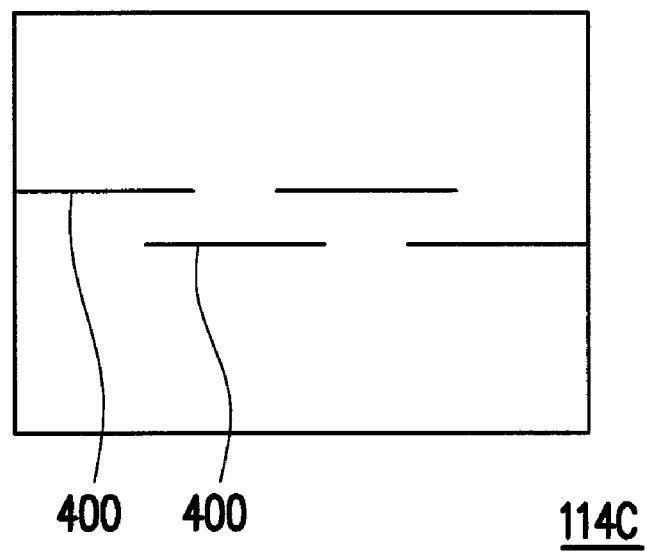
Figure 13:
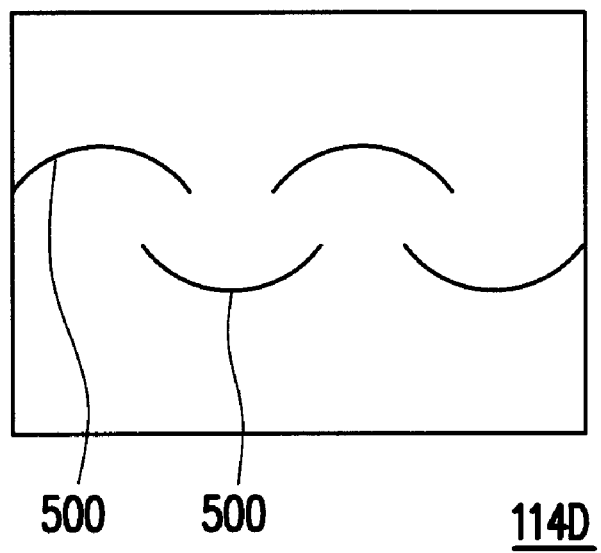

It is noted that the grooves 110 and 112 illustrated in FIG. 1 and FIG. 2 are shown by a continuous straight line. However, the grooves 110 and 112 are not limited in the manner of continuous straight line. FIGS. 10 through 13 illustrate a plurality of designs of the groove. Referring to FIG. 10, the groove 114A can includes a plurality of straight line segments 400. The straight line segments 400 are arranged in a straight line. In addition, as shown in FIG. 11, the groove 114B can be formed by a plurality of arc segments 500 arranged in a straight line. Furthermore, as shown in FIG. 12, the groove 114C can be formed by a plurality of straight line segments 400 arranged alternately along two parallel lines. Furthermore, as shown in FIG. 13, the groove 114D can be formed by a plurality of arc segments 500 arranged alternately along two parallel lines. That is to say, the pattern of the groove is not limited by consisting of a plurality of segments or merely one continuous line. In other embodiments, the pattern of the groove can be formed by a continuous meander linear pattern.

In summary, the substrate module according to the invention includes an active device array substrate, an opposite substrate, and a sealant, wherein the active device array substrate has a groove located outside a region surrounded by the sealant. A crack, if is formed, is not easily extended to entering the region surrounded by the sealant when the substrate module is subjected to en external force. Accordingly, the elements disposed on the substrate module and the display medium filled in the substrate module is prevented from damage and leakage. Thereby, the substrate module and the display panel having the substrate module have enhanced reliability.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A substrate module suitable for being filled with a display medium to form a display panel, the substrate module, comprising:
    an active device array substrate having a groove and comprising:
    a transparent substrate;
    a first conductive layer;
    a second conductive layer;
    a third conductive layer, wherein the first conductive layer, the second conductive layer, and the third conductive layer are sequentially disposed on the transparent substrate;
    a semiconductor layer, disposed corresponding to a portion of the first conductive layer, wherein the first conductive layer, the second conductive layer, the third conductive layer, and the semiconductor layer construct a plurality of pixels and a plurality of connecting terminals, the pixels are located in the region surrounded by the sealant, and the connecting terminals are located between the sealant and the border of the active device array substrate for transmitting a signal to the pixels;
    a first insulation layer, disposed between the first conductive layer and the second conductive layer; and
    a second insulation layer, disposed between the second conductive layer and the third conductive layer, wherein at least one of the first insulation layer and the second insulation layer is extended from the region surrounded by the sealant to the border of the active device array substrate so that the groove is disposed in the at least one of the first insulation layer and the second insulation layer, the groove exposes the transparent substrate, and the groove is further extended to the transparent substrate so that the transparent substrate has a thinned area;
    an opposite substrate disposed opposite to the active device array substrate; and
    a sealant, the active device array substrate and the opposite substrate being assembled through the sealant, wherein the display medium is substantially filled in a region surrounded by the sealant to form the display panel and the groove is located between the sealant and a border of the active device array substrate.

2. The substrate module as claimed in claim 1, wherein the groove is located between the connecting terminals and the border of the active device array substrate.

3. The substrate module as claimed in claim 1, wherein each of the pixels comprises an active device and a pixel electrode electrically connected to the active device.

4. The substrate module as claimed in claim 1, wherein the active device array substrate further comprises a third insulation layer disposed between the first conductive layer and the semiconductor layer, and the semiconductor layer is disposed between the transparent substrate and the first conductive layer.

5. The substrate module as claimed in claim 4, wherein the third insulation layer is extended from the region surrounded by the sealant to the border of the active device array substrate so that the groove is further disposed in the third insulation layer.

6. The substrate module as claimed in claim 1, wherein the groove is located corresponding to at least one side of the sealant.

7. The substrate module as claimed in claim 1, wherein the groove completely surrounds the sealant.

8. The substrate module as claimed in claim 1, wherein the groove is a continuous straight line groove.

9. The substrate module as claimed in claim 1, wherein the groove comprises a plurality of segment.

10. The substrate module as claimed in claim 9, wherein the segments comprises a plurality of straight line segments, a plurality of arc segments, or a combination thereof.

* * * * *